Feb. 24, 1953 D. E. TRIPP 2,629,332
HYDRAULIC TRANSMISSION
Filed Sept. 29, 1947 6 Sheets-Sheet 1

Dwight E. Tripp
INVENTOR.

BY
ATTORNEY

Feb. 24, 1953

D. E. TRIPP 2,629,332

HYDRAULIC TRANSMISSION

Filed Sept. 29, 1947

Dwight E. Tripp
INVENTOR.

BY

ATTORNEY

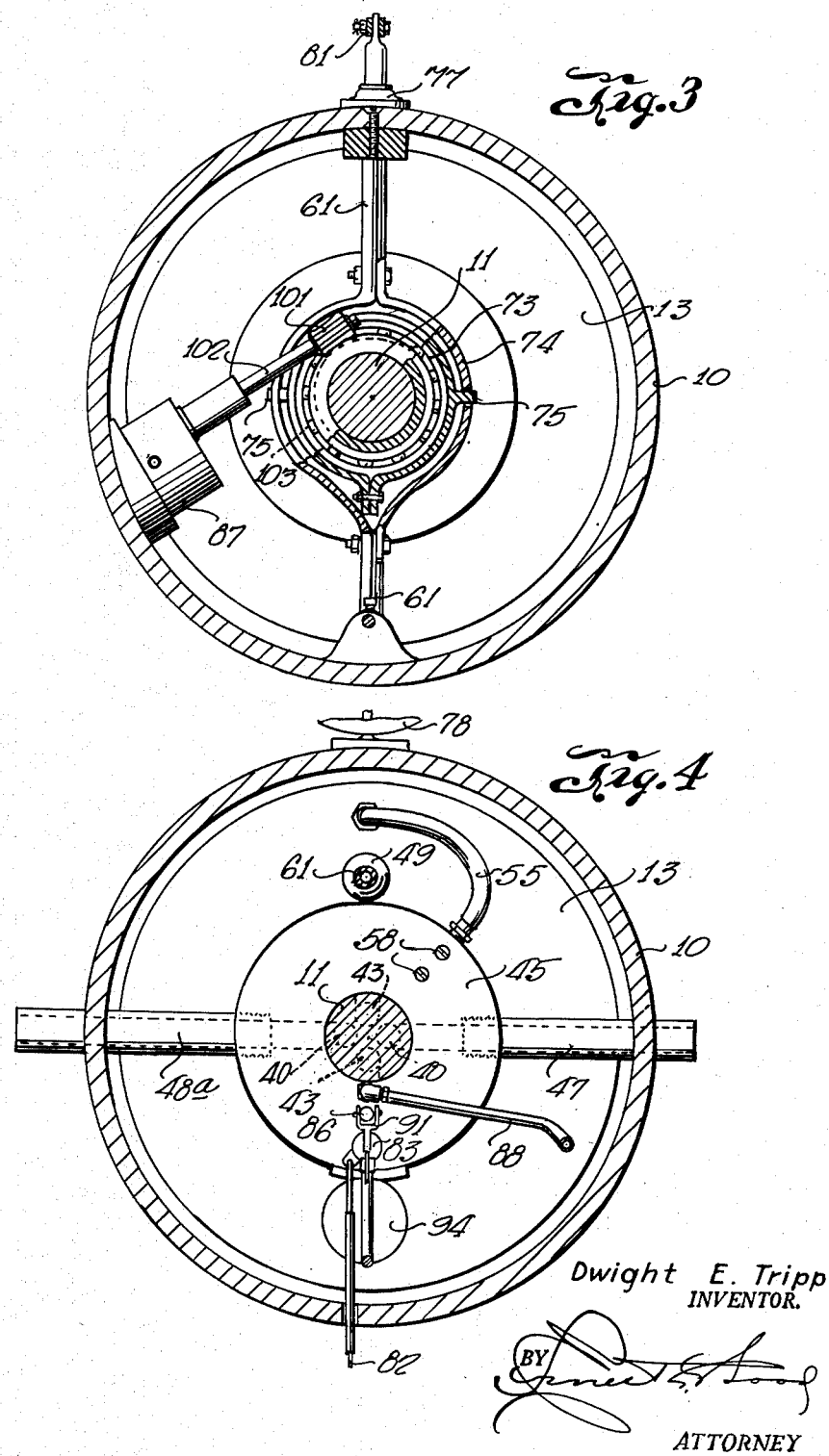

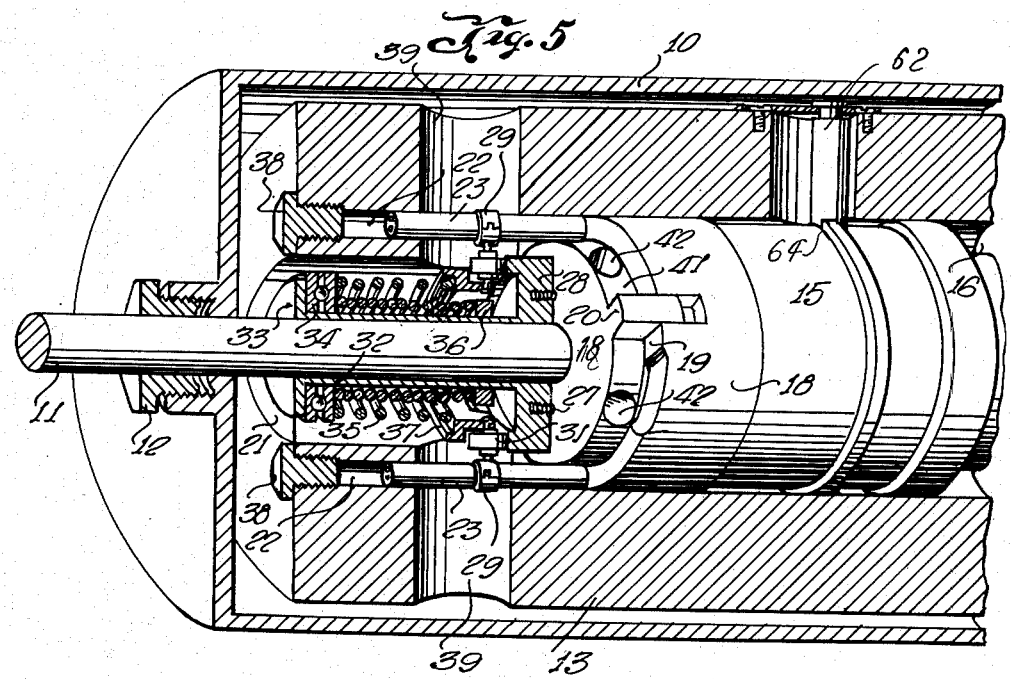
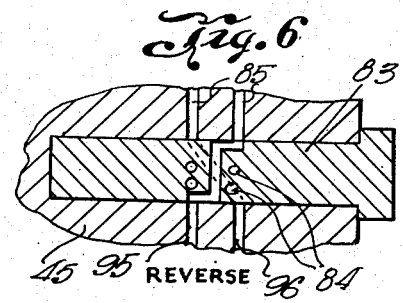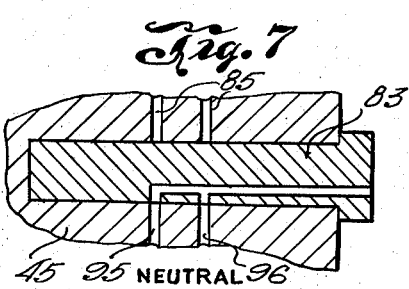
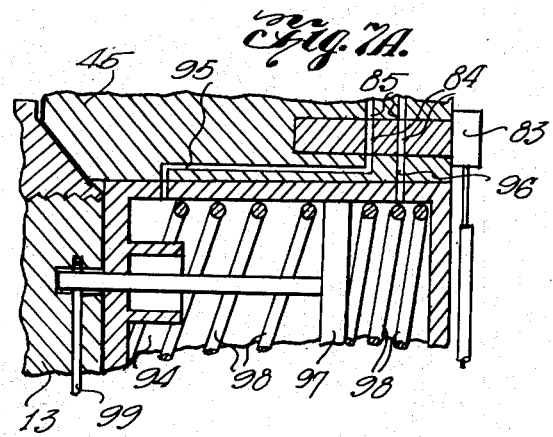

Feb. 24, 1953  D. E. TRIPP  2,629,332
HYDRAULIC TRANSMISSION
Filed Sept. 29, 1947  6 Sheets-Sheet 5
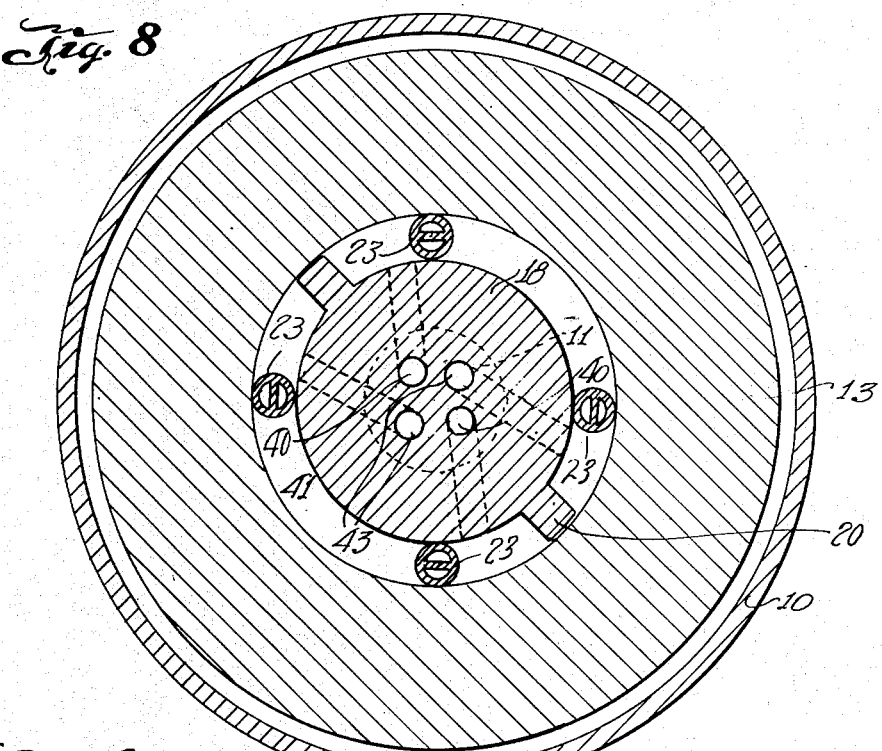
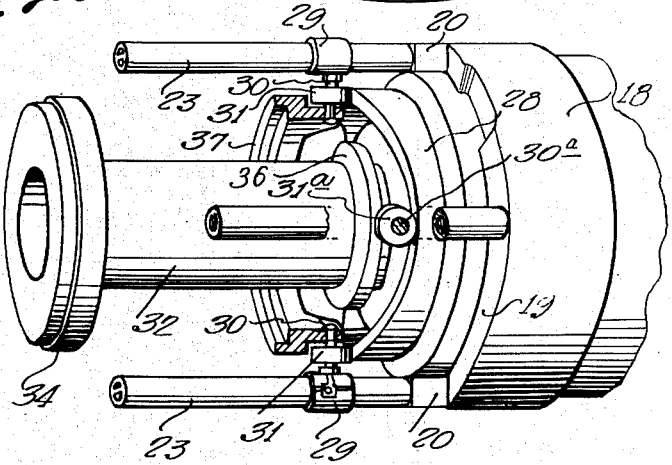
Dwight E. Tripp
INVENTOR.
BY
ATTORNEY Feb. 24, 1953 D. E. TRIPP 2,629,332
HYDRAULIC TRANSMISSION
Filed Sept. 29, 1947 6 Sheets—Sheet 6
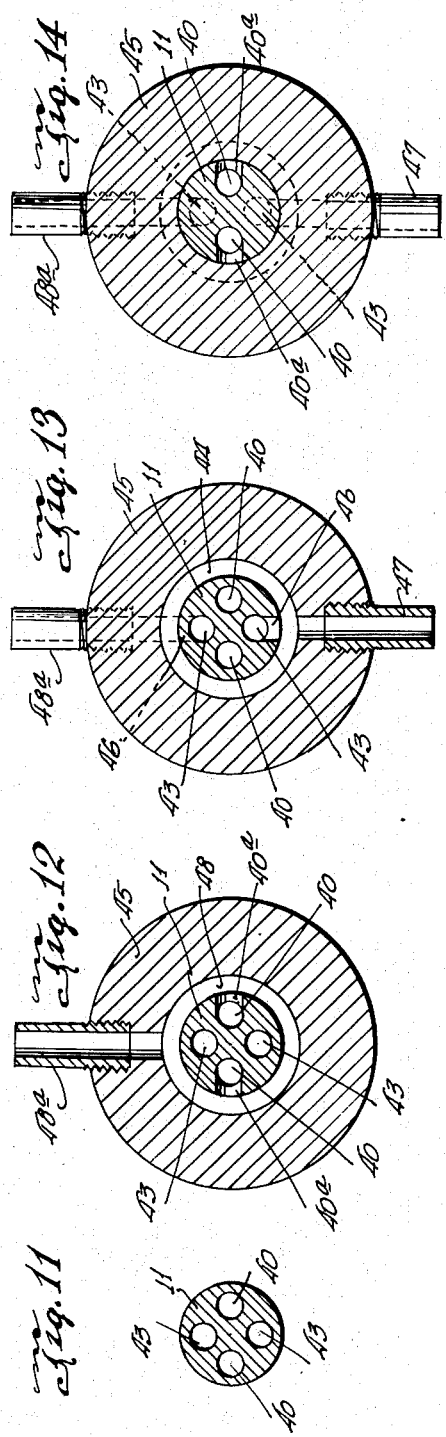
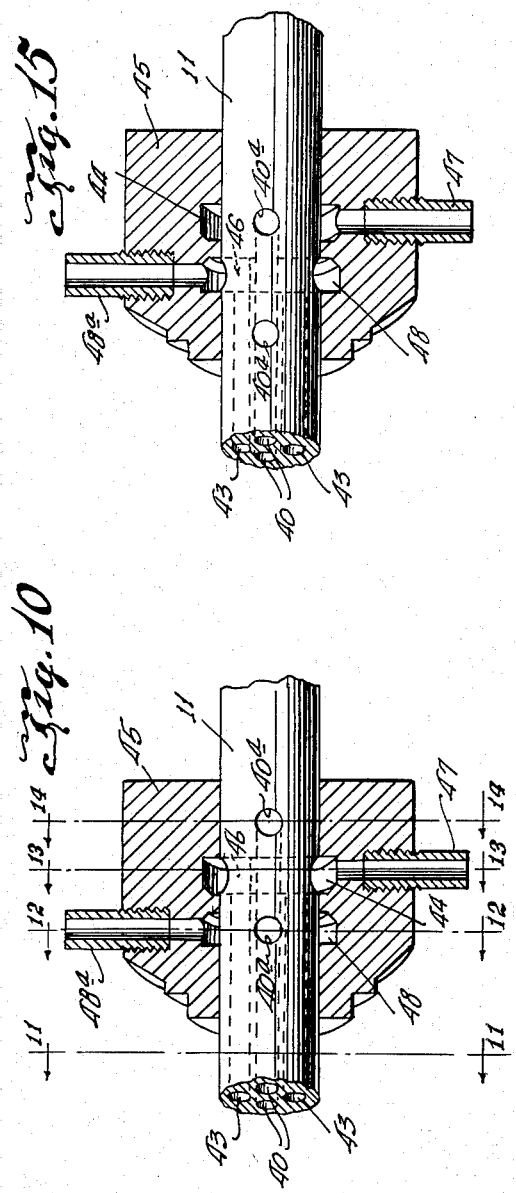
Dwight E. Tripp
INVENTOR.
ATTORNEY Patented Feb. 24, 1953

2,629,332

UNITED STATES PATENT OFFICE 2,629,332

HYDRAULIC TRANSMISSION

Dwight E. Tripp, Tyler, Tex., assignor to Tackett & Tripp, Inc., Tyler, Tex.

Application September 29, 1947, Serial No. 776,772

4 Claims. (Cl. 103—120)

This invention relates to hydraulic transmissions and it has particular reference to such a transmission designed primarily to be used as a power unit for motor vehicles but not necessarily limited thereto.

The principal object of the invention is to provide a fluid pump or power transmission having an exceptionally high degree of flexibility of control, made possible to a considerable extent through the coordinated action of two governing agents, i. e., intake vacuum, in the case of its adaptation to a motor vehicle, and the engine R. P. M. The desirable effect produced by virtue of this governing action under which the transmission is constantly operated include the ability to gain maximum horsepower through rapid engine acceleration; high cruising ratios and controlled ratio increase at predetermined engine speeds.

Another object of the invention is to provide a power transmission designed for high working pressures at low fluid volume per unit with a consequent saving in power losses. Moreover, due to continuous and uninterrupted fluid circulation, pulsations in the flow of fluid to the driven members of the transmission are reduced to a minimum or are eliminated entirely.

Still another object of the invention is to provide a pump or power transmission consisting of a housing in which operates a driving shaft, grouped about which is a series of plungers constrained by a cam track to reciprocate under spring resistance and effective to create chambers in which fluid is entrapped between said plungers and the blades of a rotor on said shaft. Provision is further made of a booster pump actuated by the driving shaft to insure maximum inlet pressure on the low pressure side of the transmission and to compensate for any leakage. Also, the provision of means to convey fluid into the operative range of the plungers through the driving shaft from whence the fluid, under increased pressure is conveyed through the said driving shaft to a driven element or elements. A reciprocable ratio control valve is provided which is actuated through the coordinating action of a centrifugal governor on the driving shaft and the variable pull of vacuum of the air intake of the engine.

With the foregoing objects in view, the invention has further reference to certain features of accomplishment which will become apparent as the description proceeds, taken in connection with the accompanying drawings wherein:

Figure 3 is a view in transverse section taken on line 3—3 on Figure 1.

Figure 4 is a view in transverse section taken on line 4—4 on Figure 1.

Figure 5 is a fragmentary perspective view partly in section and on a reduced scale, showing the cam operated plungers of the driving shaft.

Figure 6 is a fragmentary sectional view showing the manually controlled valve in reverse position.

Figure 7 is a view similar to Figure 6 but showing the control valve in neutral position.

Figure 7A is another view of the valve shown in Figures 6 and 7 showing "forward" position thereof.

Figure 8 is a view in transverse section taken on line 8—8 on Figure 1.

Figure 9 is a fragmentary perspective view, partly in section showing another position of the cam and plunger assembly as compared to Figure 5.

Figure 10 is a fragmentary view of the driving shaft showing in vertical section the reciprocating valve in "forward" position.

Figure 11 is a transverse sectional view of the driving shaft, taken on line 11—11 of Figure 10.

Figure 12 is a sectional view taken on line 12—12 of Figure 10.

Figure 13 is a sectional view taken on line 13—13 of Figure 10.

Figure 14 is a sectional view taken on line 14—14 of Figure 10, and

Figure 15 is a vertical sectional view similar to Figure 10 but showing the reciprocating valve in "reverse" position on the driving shaft.

Figure 1:
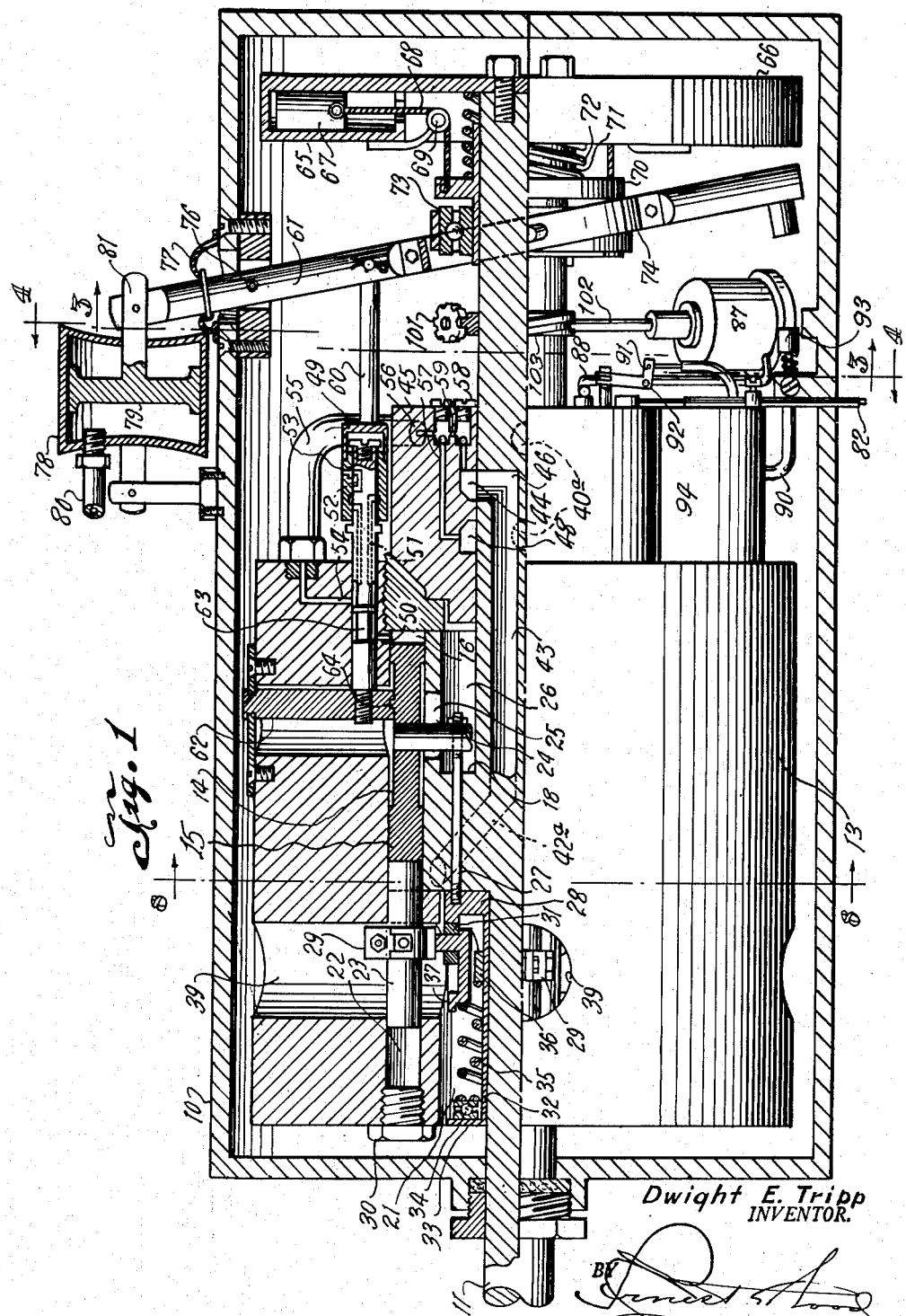
Figure 1 is a side elevational view of a transmission constructed according to the present invention, partly in section, showing forward position of the transmission.

Continuing with a more detailed description of the drawings, reference numeral 10 denotes the transmission case into which extends a driving shaft 11. The case 10 is sealed against leakage of fluid with which the case is filled, a packing gland 12 being provided at the point where the shaft 11 enters the case.

Surrounding the shaft 11 within the case 10 is the body 13 of the transmission which is a heavy casting capable of withstanding extremely high pressures. This body is stationary while the shaft 11 is rotatable therein.

The cylindrical block or body 13 has an axial bore 14 of larger diameter than that through which shaft 11 is passed and is concentric therewith. Reciprocably arranged within the bore 14 and surrounding shaft 11 is a fluid apportioning sleeve 15, whose length is such that an annular pressure chamber 16 is defined, on occasion, at the end of the sleeve opposite a similar chamber 17 at the other end of the sleeve.

Formed on the driving shaft 11 is an annular boss 18, one end of which extends beyond the end 19 of the sleeve 15 and on which is formed diametrically opposed blades 20.

An axial bore 21, larger than the shaft bore but smaller than the bore 14, enters from the end of the body 13 and communicates with the end of the bore 14. Grouped about the bore 21 is a series of small parallel bores 22, in each of which is reciprocably mounted a hollow plunger 23. The inner ends of the plungers 23 bear against the end 19 of the sleeve 15, and it will become apparent as the description proceeds that these plungers are reciprocated to move them successively out of the path of the blades 20 as the driving shaft 11 is rotated.

Figure 2:
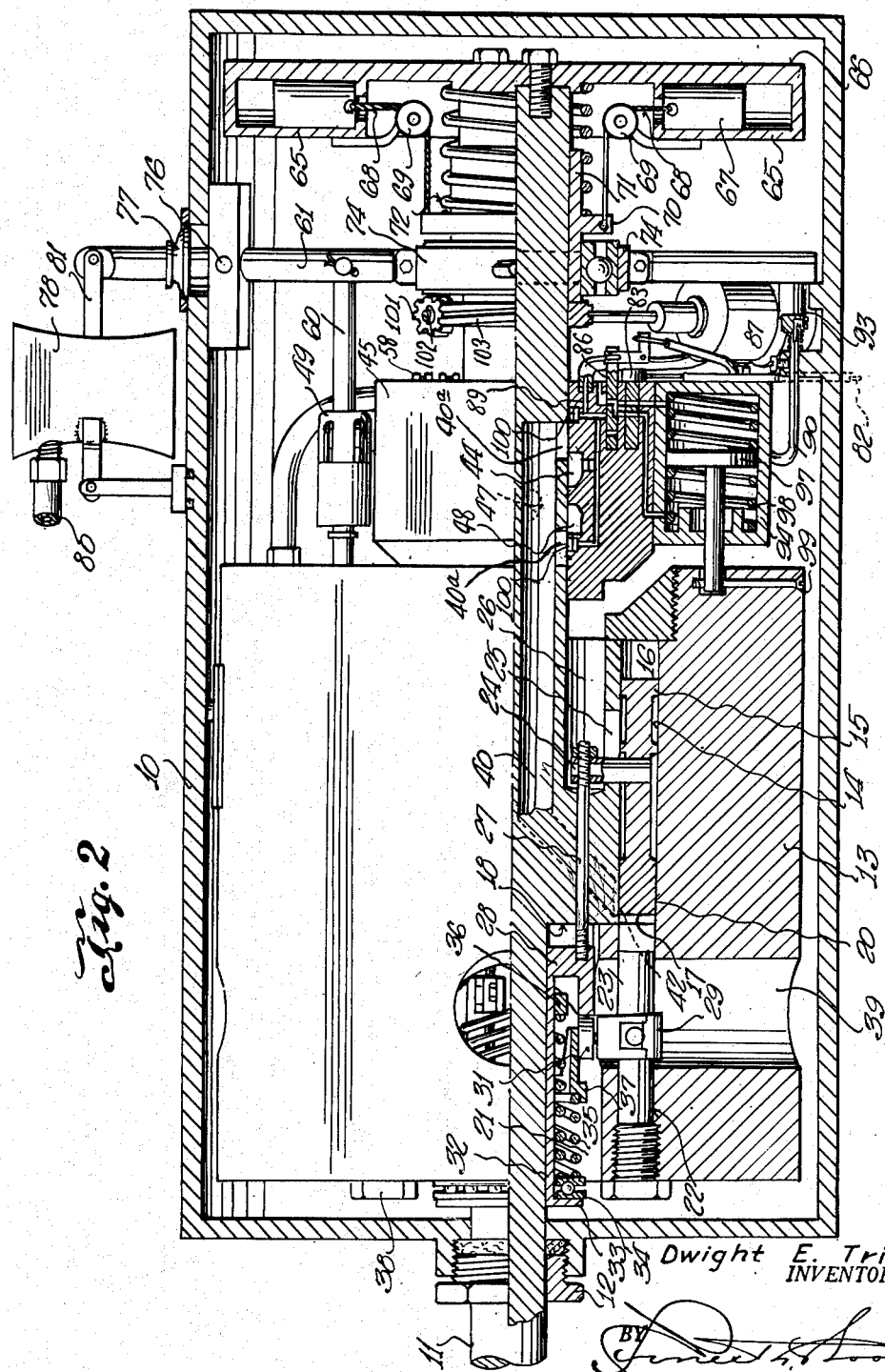
Figure 2 is a similar view but showing neutral position of the parts.

Referring again to the sleeve 15, it will be observed in Figures 1 and 2 that pins 24 secured thereto pass through slots 25 into an annular space 26 formed about the driving shaft 11 and to the inner end of each pin 24 is threadedly secured a rod 27 which rods extend forwardly through the boss 18 and their opposite ends are secured to an annular cam 28 and whose reciprocal movement is effected by corresponding reciprocal movement of the sleeve 15 through rods 27, in a manner to be later described.

Mounted on each of the reciprocable plungers 23 is a clamp 29, each carrying a pin 30 on which is mounted a roller 31. The rollers 31 operate on and are controlled by the undulating face of the cam. The cam 28 has an integral sleeve 32 which surrounds the driving shaft 11 in the intermediate bore 21 of the body 13 and on the end of this sleeve is formed an annular flange 33 which serves as a retainer for a thrust bearing 34 against which latter, in turn, bear the ends of coiled springs 35, in concentric relationship. The inner end of the smallest spring engages a ring 36 reciprocable on the sleeve 32. This ring 36 carries rollers 31a mounted on pins 30a in diametrical opposition to rollers 31. The inner end of the largest spring bears against an annular flange 37, to which it attached the pivots 30 of rollers 31, to resist reciprocative displacement of plungers 23. It is apparent from this description that the cam 28 is rotatable with the driving shaft 11, yet the valve lifting assembly including the plungers 23 are constrained against other than reciprocative movement.

The plungers 23 are hollow, as shown, in order that they may move freely in their respective bores without building up resistive pressure at each end. Threaded plugs 38 close the outer ends of the plunger bores 22 and accessibility is had to the clamps 29 of the plungers 23 through radial openings 39 in the body 13.

The driving shaft 11 has an axial fluid inlet passage 40 through which fluid enters the annular pressure chamber, indicated in Figures 5 and 8 by reference numeral 41, the same being defined at the end 19 of sleeve 15 and divided into equal compartments by the rotor blades 20 (Fig. 5). The fluid through the passage 40 is admitted on the low pressure or inlet side of the rotor blades 20 through inlet ports 42a when the driving shaft 11 has rotated to a position preparatory to displacement of plungers 23. Intake of fluid is constant behind the rotor blades 20 while compression is constant in front of the same except when load drives the pump, in which case the pressure zones are reversed.

Fluid is forced from the compression chamber in advance of the blades 20 through a discharge port 42a into a discharge passage 43 in the driving shaft 11 parallel with inlet passage 40. From passage 43, the fluid enters an annular chamber 44 of a reciprocating valve 45 when the said annular chamber 44 is in register with the outlet 46 of said passage 43. From the annular chamber 44 of the reciprocating valve 45, the fluid under pressure, flows through pressure line 47 (Fig. 4) to the fluid motors of the vehicle wheels, not shown, on to other driven element or elements. After having performed its work, the fluid returns to the reciprocating valve chamber 48 through line 48a and from which it re-enters the return passage 40 by way of inlet port 40a for recirculation.

The reciprocating sleeve 15 performs the function of varying the fluid displacement of the pump, as it operates against the resistance of fluid both in the pressure chamber 41 and in the annular space 16 at the opposite or rear end of the sleeve. In order to increase the capacity of the pump, it is necessary to bleed the annular chamber 16 to increase the volume of fluid handled. This is accomplished by actuating a ratio control valve 49 (Figs. 1 and 2) so that fluid will flow from chamber 16 through passages 50, 51, 52 and 53, back into the fluid reservoir which occupies the space between the case 10 and body 13. To lower the ratio, it is necessary to open the annular chamber 16 to fluid in the pressure passage 43. This is accomplished through passage 54 (Fig. 1) into which fluid flows from a flexible tube 55, entering the same through a passage 56 in the reciprocating valve body 45 from the annular chamber 48 thereof through a communicating passage 57, the latter controlled by check valves 58 which latter serve the function to select high pressures for the reason that one is open to pressures originating in passage 43 and is effective to close the companion valve, by virtue of a communicating passage 59.

To operate the ratio control valve 49, a link 60 is connected thereto, as shown in Figures 1 and 2 and the opposite end of the link is connected to an arm 61 intermediate its ends. It will be explained presently how this arm is oscillated to impart reciprocal motion to link 60 and valve 49, but in the meantime, it is pointed out that while the ratio control valve 49 is supplying pressure to the annular chamber 16 through passage 50, a force is exerted on sleeve 15 to the left in Figure 1. This results in similar displacement of a cross-head 62 due to a connection afforded between the valve 49 and cross-head by a rod 63. By virtue of a tongue and groove 64, forming connection between the cross-head 62 and sleeve 15, the latter is permitted to rotate with the shaft 11, the cross-head being limited to reciprocative displacement.

It is apparent from the foregoing that fluid volume in the annular pressure chamber 41 is in direct proportion to the area of the chamber 17 in advance of the sleeve 15 (Fig. 1), that is to say, when the sleeve 15 is moved to the left, the volume of fluid in chamber 41 is decreased and when it is moved to the right, the volume is increased in chamber 41.

The governing means for the transmission consists of two coordinating elements, i. e., a centrifugal governor and a piston actuated by vacuum created in the intake manifold of the engine. By virtue of these coordinating elements, it is possible to control the transmission for any desired effect. The centrifugal governor consists of guides 65 radially arranged about the axis of the shaft 11 in a flywheel 66 mounted on the end of the latter. Slidably arranged in these guides are weights 67, to which are attached wire lines 68 operating over pulleys 69. The opposite ends of these wire lines extend at right angles and are attached to the flange 70 of a sleeve 71 which latter is slidably mounted on the shaft 11. A coiled spring 72 interposed between the flange 70 and hub of the flywheel 66 resists outward displacement of weights 65 when influenced by centrifugal force imposed by rotation of shaft 11.

Mounted on an extension of the sleeve 71 is a ball bearing 73 and surrounding the outer race of this bearing is a collar 74, the latter being pivoted thereto at 75 (Fig. 3) at diametrically opposite points. The ring or collar 74 therefore is constrained against other than oscillative displacement on its pivots 75, hence the arm or arms 61 attached thereto may oscillate as described, on a pivot 76 adjacent the upper end, at which point a seal 77 is provided to preclude leakage of fluid about the arm where it passes through the case 10.

The centrifugal governor may actuate the arm 61 on its pivot 76 by exerting a pull on the sleeve 71 at high engine speeds and since the bearing 73 is mounted on the sleeve it also will be moved to correspondingly move the arm 61. Since link 60 is attached to the arm 61, the valve 49 will be actuated to change the relative positions of the fluid passages controlled thereby to determine the action of the sleeve 15 to control the volume of fluid entering the pressure chamber 41, in the manner described.

Coordinating with the centrifugal governor just described is a cylinder 78 mounted exteriorly of the case 10, in which operates a piston 79. Engine manifold suction through flexible line 80 displaces the piston 79 to exert a pull on link 81, thereby rocking arm 61 on its pivot 76. The effect on the arm 61 is similar to its actuation by the centrifugal governor in the sense that the sleeve 15 is affected through operation of the ratio control valve 49. It is through the described arrangement that the proper ratio between power and load may occur at the proper time.

Manual control of the transmission is effected through the medium of a cable 82 which extends to the instrument panel of the vehicle. Designations of "Forward," "Neutral" and "Reverse" are provided to guide the operator. The cable 82 actuates a rotary valve 83 (Figs. 1, 2, 6, 7 and 7A) which, in order to move the vehicle forward, is positioned so that its passages 84 will be aligned with passages 85 in the body of the reciprocating valve 45. A clutch valve 86 (Fig. 2) controls the passages 85, through which fluid is introduced at comparatively low pressure of approximately 100 pounds, from a pump 87, through pump discharge line 88 and passage 89.

The clutch valve 86 is actuated by a cable 90 (Fig. 2), one end of which is attached to a bell crank 91, pivoted at 92. The opposite end of the cable 90 is engageable at 93 by the lower end of the arm 61. Therefore, the clutch valve 83 will be actuated by the arm 61 when the engine is speeded up or idled.

Figures 6 and 7 show respectively the reverse and neutral positions of the rotary valve. At the side of this valve opposite the clutch valve 86, the passages 84 thereof communicate with a cylinder 94 through passages 95 and 96 (Fig. 7A). As shown in Figure 2, the clutch valve 86 is in neutral position and the corresponding position of the rotary valve is as shown in Figure 7, although the rotary valve can be in neutral, engine acceleration will not effect engaging of the load until it is placed in "forward" or "reverse" position. In such position, pressure at atmosphere will pass into cylinder 94 on opposite sides of its piston 97, through passages 95 and 96. However, in "forward" position of rotary valve 83, fluid will enter cylinder 94 through passage 95 while in "reverse" position thereof, pressure will enter cylinder 94 on the opposite side of piston 97 through passage 96. A coil spring 98 is arranged in the cylinder 94 on each side of its piston 97 to balance the same and make it possible to go into neutral when piston is exposed to the same pressure on both sides.

It will be observed in Figure 2 that the cylinder 94 is mounted on the underside of the reciprocating valve body 45 and moves therewith while the rod of its piston 97 passes into a recess in the transmission body 13 and is stationarily anchored by means of a pin 99 secured in the body 13. Accordingly, when pressure is introduced into the cylinder 94 through one or the other of the passages 95 or 96, the cylinder 94 will be displaced, thereby actuating the reciprocating valve 45. It is obvious that one of the cylinders 94 can be mounted on each side of the reciprocating valve 45 to better balance the same.

When the reciprocating valve is moved by pressure entering cylinder 94 as described, it is moved from one extreme to the other on the driving shaft 11 therefore the annular chambers 44 and 48 thereof are aligned alternately with the intake and outlet ports 40a and 46 of the return and pressure lines 40 and 43 respectively which latter are, as stated, in respective communication with flexible lines 47 and 48a which lead to and from the driven elements.

In Figure 2 may be seen a group of three check valves 100 which effect communication between the inlet line 88 of pump 87 and the return line 40. These valves are provided to insure entry of fluid into the low pressure or intake side of the transmission under any conditions. The object for this is to keep all slack out of the intake side of the transmission and to compensate for leakage.

The pump 87 is driven by means of a worm 101 mounted on the impeller shaft 102 of the pump, said worm being engaged with a worm gear 103 mounted on the drive shaft 11.

The reciprocating valve 45, as shown in Figure 1 is in the "forward" position. When in the position at the extreme right it will be in "reverse" position but as shown in Figure 2, it is in "neutral" position. The flow of fluid through passages 40 and 43 is reversed in the extreme right position, and when the annular chambers 44 and 48 are in an intermediate position as in Figure 2 in relation to the intake and outlet ports of the pressure and return passages 40 and 43, the position is "neutral" and the fluid will merely circulate in passages 40 and 43 with no effect.

In operation, rotation of shaft 11 imparts rotation to the cam 28 and the latter, in turn, reciprocates the plungers 23 in pairs, causing them to successively move out of the path of rotor blades 20 in the annular fluid chamber 41 which is divided into intake and exhaust compartments by these blades and plungers coordinately. In the meantime, fluid enters the inlet or low pressure compartment of the annular chamber 41 through longitudinal passage 40 of the drive shaft 11 behind the rotor blade while compression takes place in the companion compartment forwardly of the blade 20 whence it is expelled under high pressure into passage 43 from this passage into the annular chamber 44 of the reciprocating valve 45, thence to the fluid motors of the vehicle wheels through flexible lines 47.

Fluid continues to flow to the fluid motors and returns through flexible lines 48a for recirculation as described as long as the shaft 11 rotates except when the manual control cable 82 is actuated to place the transmission in "reverse" or "neutral" position, in either of which cases, circulation in the passages 40 and 43 remains unchanged but the changed position of reciprocating valve 45 reverses the inlet and outlet ports of valve 45 in relation to the inlet and outlet ports of passages 40 and 43.

When cable 82 is moved into "reverse" position, this has the effect to dispose rotary valve 83 in the position shown in Figure 6, reversing the passages thereof in relation to fluid passages 85 and passages 95 and 96. Fluid pressure entering cylinder 94 causes the cylinder to move to the opposite extreme, carrying with it the reciprocating valve 45, thereby bringing into register the ports 48 and 44 thereof with inlet and outlet ports of passages 40 and 43 in the manner explained in the preceding paragraph, whereupon fluid pressure is applied to the wheel fluid motors through flexible line 48a instead of line 47.

When "neutral" position obtains, the control valve 83 is disposed as shown in Figure 7, fluid being cut off from cylinder 94 while springs 98 balance the cylinder in its centermost position to similarly dispose the reciprocating valve 45. In this position of valve 45, its annular chambers 44 and 48 are disposed in an intermediate position in relation to the inlet ports of passages 40 and 43, during which fluid will merely circulate in these passages and will have no effect to drive the fluid motors of the vehicle wheels.

In any case, whether in forward or reverse position, the transmission is under constant control of the two governing factors, i. e., vacuum from the engine intake and the centrifugal governor, these being in balance so that the desired effect or ratio will be predetermined at all times. Ratio is increased when there is a partial vacuum in cylinder 78 and when the engine is accelerated. In any case, the pivoted arm 61 is effective to actuate the ratio control valve 49 to vary the volume of fluid entering and leaving the rotor and to operate the clutch valve 86 which controls fluid passing through the rotary, manually actuated valve 83 and consequently the positioning of the reciprocating valve 45 through cylinder 94 to determine the flow course of fluid from the latter.

Manifestly, the construction as shown and described is capable of some modification and such modification as may be construed to fall within the scope and meaning of the appended claims is also considered to be within the spirit and intent of the invention.

What is claimed is:

1. A hydraulic pump including a driving element, a body embracing said driving element and having a longitudinal bore, a fluid apportioning sleeve reciprocably mounted on said driving element in said bore, an annular boss on said driving element, said body, said boss and said sleeve defining an annular pressure chamber, rotor blades on said boss projecting into said pressure chamber, the capacity of said pressure chamber varying with the position of said sleeve, a plurality of reciprocable plungers mounted in longitudinal bores provided in said body movable into said chamber and cooperating with said rotor blades to impose pressure on fluid entering said chamber, said rotor blades and said plungers separating said chamber into intake and exhaust compartments, an annular cam rotatable with said driving element for actuating said plungers, spring means resisting movement of said plungers, said driving element having fluid circulating passages arranged longitudinally therein communicating with an outlet and an inlet of said pump and with said intake and exhaust compartments, means on said body for varying the position of said sleeve to vary the capacity of said pressure chamber to vary the displacement of said pump, and means for maintaining hydrostatic balance of fluid pressures at each end of said plungers, said cam being longitudinally slidable on said driving element, and means connecting said cam and said sleeve whereby reciprocal movement of said sleeve results in simultaneous longitudinal movement of said cam.

2. A hydraulic pump including a driving shaft, a stationary body embracing said driving shaft and having a longitudinal bore, said bore extending parallel to and concentric with the longitudinal central axis of said driving shaft; a fluid apportioning sleeve mounted on said driving element in said bore for reciprocable movement parallel to said central axis; an annular boss on said driving element, said body, said boss and said sleeve defining an annular pressure chamber; rotor blades on said boss projecting into said pressure chamber, the capacity of said pressure chamber varying with the position of said sleeve; a plurality of plungers mounted in longitudinal bores in said body for reciprocable movement parallel to said central axis into said chamber, said rotor blades and said plungers separating said chamber into intake and exhaust compartments, said plungers cooperating with said rotor blades to impose pressure on fluid entering said chamber; a cam disposed in a plane perpendicular to said central axis and rotatable with said driving element for actuating said plungers to positions without said chamber and spring means biasing said plungers toward said chambers, said driving element having circulating passages arranged longitudinally therein, communicating with an outlet and an inlet of said pump and with said intake and exhaust compartments.

3. A hydraulic pump including a driving shaft, a stationary body embracing said driving shaft and having a longitudinal bore, said bore extending parallel to and concentric with the longitudinal central axis of said driving shaft; a fluid apportioning sleeve mounted on said driving element in said bore for reciprocable movement parallel to said central axis; an annular boss on said driving element, said body, said boss and said sleeve defining an annular pressure chamber; rotor blades on said boss projecting into said pressure chamber, the capacity of said pressure chamber varying with the position of said sleeve; a plurality of plungers mounted in longitudinal bores in said body for reciprocable movement parallel to said central axis into said chamber, said plungers cooperating with said rotor blades to impose pressure on fluid entering said chamber, said blades and plungers separating said chamber into intake and exhaust compartments; a cam disposed in a plane perpendicular to said central axis and rotatable with said driving element for actuating said plungers to positions without said chamber, spring means biasing said plungers toward said chambers, said driving element having circulating passages arranged longitudinally therein, communicating with an outlet and an inlet of said pump and with said intake and exhaust compartments; said cam being longitudinally slidable on said driving element; means connecting said cam and said sleeve whereby reciprocal movement of said sleeve results in simultaneous longitudinal movement of said cam; and means for moving said sleeve to vary the capacity of said chamber to vary the displacement of said pump.

4. A hydraulic pump including a driving shaft, a stationary body embracing said driving shaft and having a longitudinal bore, said bore extending parallel to and concentric with the longitudinal central axis of said driving shaft; a fluid apportioning sleeve mounted on said driving element in said bore for reciprocable movement parallel to said central axis; an annular boss on said driving element, said body, said boss and said sleeve defining an annular pressure chamber; rotor blades on said boss projecting into said pressure chamber, the capacity of said pressure chamber varying with the position of said sleeve; a plurality of plungers mounted in longitudinal bores in said body for reciprocable movement parallel to said central axis into said chamber, said plungers cooperating with said rotor blades to impose pressure on fluid entering said chamber, said blades and plungers separating said chamber into intake and exhaust compartments; a cam disposed in a plane perpendicular to said central axis and rotatable with said driving element for actuating said plungers to positions without said chamber, spring means biasing said plungers toward said chambers, said driving element having circulating passages arranged longitudinally therein, communicating with an outlet and an inlet of said pump and with said intake and exhaust compartments, said cam being longitudinally slidable on said driving element; means connecting said cam and said sleeve whereby reciprocal movement of said sleeve results in simultaneous longitudinal movement of said cam; said body, said sleeve and said driving element defining a second chamber remote from said plungers; and valve means for selectively connecting said second chamber to one of said longitudinal bores whereby fluid under pressure may be admitted into said second chamber to move said sleeve toward said plungers to decrease the displacement of said pump and for selectively connecting said second chamber to an outlet whereby fluid may escape from said second chamber to permit said sleeve to move away from said plungers to increase the displacement of said pump.

DWIGHT E. TRIPP.

REFERENCES CITED

The following references are of record in the file of this patent:

UNITED STATES PATENTS

| Number | Name | Date |
|---|---|---|
| 1,008,202 | Schmucker | Nov. 7, 1911 |
| 1,156,816 | Rich | Oct. 12, 1915 |
| 1,246,322 | Richer et al. | Nov. 13, 1917 |
| 1,276,372 | Johnson | Aug. 20, 1918 |
| 1,532,735 | Dickerson | Apr. 7, 1925 |
| 1,797,905 | Dooley | Mar. 24, 1931 |
| 1,954,793 | Averin | Apr. 17, 1934 |
| 2,190,122 | Mohler | Feb. 13, 1940 |

FOREIGN PATENTS

| Number | Country | Date |
|---|---|---|
| 6,431 | Great Britain | Mar. 14, 1911 |